United States Patent
Wen et al.

(10) Patent No.: US 10,500,531 B2
(45) Date of Patent: Dec. 10, 2019

(54) FILTERING ELEMENT, FILTERING EQUIPMENT AND WATER CIRCULATION CLEANING SYSTEM

(71) Applicants: BOE Technology Group Co., Ltd., Beijing (CN); Beijing BOE Display Technology Co., Ltd., Beijing (CN)

(72) Inventors: Donglei Wen, Beijing (CN); Zhenshan Lu, Beijing (CN); Bin Chang, Beijing (CN); Bo Bai, Beijing (CN); Shichao Fan, Beijing (CN); Lijun Yin, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 227 days.

(21) Appl. No.: 15/236,809

(22) Filed: Aug. 15, 2016

(65) Prior Publication Data

US 2017/0266595 A1    Sep. 21, 2017

(30) Foreign Application Priority Data

Mar. 18, 2016    (CN) .......................... 2016 1 0158809

(51) Int. Cl.
*B01D 37/02*    (2006.01)
*C02F 1/00*    (2006.01)
(Continued)

(52) U.S. Cl.
CPC ............ *B01D 37/02* (2013.01); *B01D 29/114* (2013.01); *B01D 29/603* (2013.01);
(Continued)

(58) Field of Classification Search
None
See application file for complete search history.

(56) References Cited

U.S. PATENT DOCUMENTS 6,458,303 B1 * 10/2002 Fuehrer ................ B01D 29/071
210/455
8,029,680 B2    10/2011 Shinoda et al.
(Continued)

FOREIGN PATENT DOCUMENTS

CN        102574031 A     7/2012
CN        202583698 U    12/2012
(Continued)

OTHER PUBLICATIONS

First Office Action for Chinese Patent Application No. 201610158809.6, dated Mar. 24, 2017, 13 pages.
(Continued)

*Primary Examiner* — Richard C Gurtowski
(74) *Attorney, Agent, or Firm* — Westman, Champlin & Koehler, P.A.

(57) ABSTRACT

Embodiments of the present invention are a filtering element, a filtering equipment and a water circulation cleaning system. In an embodiment, a filtering element includes a filtering screen and filter particles adhered to one side of the filtering screen, sizes of the filter particles being gradually increased in a direction from the one side to the other side of the filtering screen. Meanwhile, there also provides a filtering equipment including the abovementioned filtering element and a water circulation cleaning system including the abovementioned filtering equipment.

13 Claims, 4 Drawing Sheets

(51) Int. Cl.
 *B01D 29/11* (2006.01)
 *B01D 29/60* (2006.01)
 *B01D 29/66* (2006.01)
 *C02F 103/34* (2006.01)

(52) U.S. Cl.
 CPC ........... *B01D 29/606* (2013.01); *B01D 29/66* (2013.01); *C02F 1/004* (2013.01); B01D 2101/005 (2013.01); C02F 2103/346 (2013.01); C02F 2209/03 (2013.01); C02F 2209/40 (2013.01); C02F 2303/16 (2013.01)

(56) References Cited

U.S. PATENT DOCUMENTS

| | | | |
|---|---|---|---|
| 9,149,746 B2 | 10/2015 | Choi | |
| 2003/0168389 A1* | 9/2003 | Astle | B01D 27/101 210/85 |
| 2004/0094470 A1* | 5/2004 | Jackson | A01K 63/045 210/411 |
| 2005/0199558 A1* | 9/2005 | Jensen | B01D 15/00 210/767 |
| 2011/0272349 A1* | 11/2011 | Rausch | C02F 3/327 210/602 |
| 2012/0211430 A1* | 8/2012 | Choi | B01D 39/02 210/702 |

FOREIGN PATENT DOCUMENTS

| | | |
|---|---|---|
| CN | 205649934 U | 10/2016 |
| EP | 2184096 A1 | 5/2010 |
| JP | 58-112015 A | 7/1983 |
| WO | 2006041079 A1 | 4/2006 |

OTHER PUBLICATIONS

Third Office Action for Chinese Patent Application No. 201610158809.6, dated Nov. 27, 2017, 8 pages.

* cited by examiner

FILTERING ELEMENT, FILTERING EQUIPMENT AND WATER CIRCULATION CLEANING SYSTEM

CROSS-REFERENCE TO RELATED APPLICATION

This application claims the benefit of Chinese Patent Application No. 201610158809.6 filed on Mar. 18, 2016 in the State Intellectual Property Office of China, the whole disclosure of which is incorporated herein by reference.

BACKGROUND

1. Technical Field

Embodiments of the present invention relate to the field of cleaning technology, and particularly to a filtering element, a filtering equipment and a water circulation cleaning system.

2. Description of the Related Art

There generally have high environmental and product cleanliness requirements in TFT-LCD industry. Since residues including stains, colloid substances, glass debris and the like on surface of a substrate are required to be cleaned out before the substrate is put into production line, kinds of cleaning machines are generally used to clean surface of the substrate, in the TFT-LCD industry. As a result, there has great amount of usage of pure water daily, and waste water produced after the cleaning is unable to recycle and thus is discharged directly, thereby causing serious waste of water source.

Therefore, it is a technical problem to be solved urgently in the art to provide an effective filtering equipment which is capable of filtering and reusing waste water.

SUMMARY

In accordance with one aspect of the present invention, there is provided a filtering element comprising a filtering screen and filter particles adhered to one side of the filtering screen, sizes of the filter particles being gradually increased in a direction from the one side to the other side of the filtering screen.

In some embodiments, the filtering screen is in a cylinder shape.

In some embodiments, the filter particles comprise vegetation fibre particles.

In some embodiments, the filtering screen comprises an elastic filtering screen.

In accordance with another aspect of the present invention, there is provided a filtering equipment comprising the abovementioned filtering element.

In some embodiments, the filtering equipment may further comprise a processing chamber having a reclaimed water inlet and a recycling water outlet, wherein, the filtering screen is positioned inside the processing chamber and covers the recycling water outlet, and, the one side of the filtering screen is communicated with the reclaimed water inlet while the other side of the filtering screen is communicated with the recycling water outlet.

In some embodiments, the filtering equipment may further comprise a first water pump having a water inlet pipe connected to the recycling water outlet, the first water pump being configured to draw out water within the processing chamber through the recycling water outlet.

In some embodiments, the filtering equipment may further comprise a water flow sensor provided at a water outlet pipe of the first water pump and configured to detect an actual water flow at the water outlet pipe of the first water pump.

In some embodiments, the filtering equipment may further comprise a water pressure sensor provided at the water outlet pipe of the first water pump and configured to detect an actual water pressure at the water outlet pipe of the first water pump.

In some embodiments, the filtering equipment may further comprise a water flow judgement circuit, a water pressure judgement circuit and an adjustment unit, wherein the water flow judgement circuit is connected with the water flow sensor and the water pressure judgement circuit, the water pressure judgement circuit is connected with the water pressure sensor and the adjustment unit, and the adjustment unit is connected with the first water pump and the water pressure judgement circuit;

the water flow judgement circuit is configured to judge whether or not the actual water flow detected by the water flow sensor is less than a first water flow value;

the water pressure judgement circuit is configured to judge whether or not the actual water pressure detected by the water pressure sensor is greater than a first outlet water pressure value if it is judged by the water flow judgement circuit that the actual water flow is less than the first water flow value; and the adjustment unit is configured to turn down the actual water pressure at the water outlet pipe of the first water pump if it is judged by the water pressure judgement circuit that the actual water pressure detected by the water pressure sensor is greater than the first water pressure value, so that the actual water flow at the water outlet pipe of the first water pump has a second water flow value which is greater than the first water flow value.

In some embodiments, the filtering equipment may further comprise an alarm unit connected to the water pressure judgement circuit and configured to alarm if it is judged by the water pressure judgement circuit that the actual water pressure detected by the water pressure sensor is less than or equals to the first outlet water pressure value.

In some embodiments, the processing chamber may further comprise a backwash inlet connected to a pure water storage tank and a backwash outlet connected to a water inlet pipe of a second pump;

the backwash inlet is covered by the filtering screen, the one side of the filtering screen is communicated with the backwash outlet, and the other side of the filtering screen is communicated with the backwash inlet;

the pure water storage tank is configured to store pure water; and the second pump is configured to draw out water within the processing chamber through the backwash outlet.

In some embodiments, the processing chamber may further comprise a coating inlet connected to a mixed water storage tank and a coating outlet connected to a water inlet pipe of a third pump, and a water outlet pipe of the third pump is connected to the mixed water storage tank;

the coating outlet is covered by the filtering screen, the one side of the filtering screen is communicated with the coating inlet, and the other side of the filtering screen is communicated with the coating outlet;

the mixed water storage tank is configured to store a mixed solution containing pure water and filter particles; and the third pump is configured to draw out water within the processing chamber through the coating outlet.

In accordance with yet another aspect of the present invention, there is provided a water circulation cleaning system comprising the abovementioned filtering equipment.

In some embodiments, the water circulation cleaning system may further comprise a waste water reclaiming and storage tank, a clean water supply and storage tank and a number of cleaning equipments, the waste water reclaiming and storage tank is connected to each of the cleaning equipments and the reclaimed water inlet of the filtering equipment by corresponding pipelines, and, the clean water supply and storage tank is connected to each of the cleaning equipments and the recycling water outlet of the filtering equipment by corresponding pipelines;

the waste water reclaiming and storage tank is configured to reclaim waste water produced in each of the cleaning equipments and to supply the filtering equipment with the reclaimed waste water; and the clean water supply and storage tank is configured to reclaim recycling water that is performed a filtration process by the filtering equipment and to supply each of the cleaning equipments with water source for cleaning.

In some embodiments, a fourth water pump is provided at a pipeline between the clean water supply and storage tank and each of the cleaning equipments, a water inlet pipe of the fourth water pump is communicated with the clean water supply and storage tank, and, a water outlet pipe of the fourth water pump is communicated with the cleaning equipments; and the fourth water pump is configured to pump recycling water within the clean water supply and storage tank to corresponding cleaning equipments.

In some embodiments, the water circulation cleaning system may further comprise a water straight supply pipeline connected to the clean water supply and storage tank and configured to supply the clean water supply and storage tank with water when an actual water storage in the clean water supply and storage tank is less than a water storage.

DETAILED DESCRIPTION OF THE EMBODIMENTS

In order to provide a more clear understanding of technique solutions according to embodiments of the present invention for those skilled in the art, a filtering element, a filtering equipment and a water circulation cleaning system according to the embodiments of the present invention will be further described hereinafter in detail and completely with reference to the attached drawings.

First Embodiment

Figure 1:
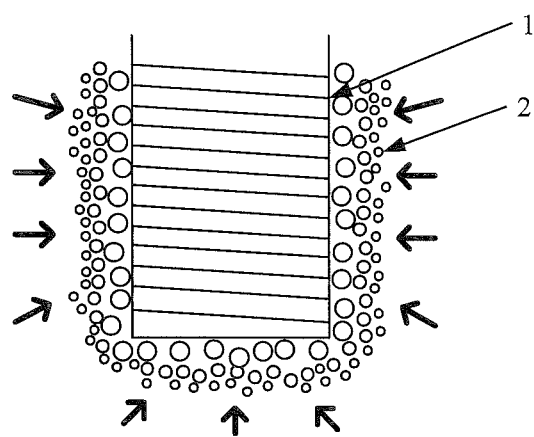
FIG. 1 is a schematic view of a filtering element according to a first embodiment of the present invention.

FIG. 1 is a schematic view of a filtering element according to a first embodiment of the present invention. Referring to FIG. 1, the filtering element comprises a filtering screen 1 and filter particles 2 adhered to one side of the filtering screen 1, and sizes of the filter particles 2 are gradually increased in a direction from the one side to the other side of the filtering screen, in which a thick line arrow represents a flow direction of water.

In this embodiment, when waste water moves from the one side to the other side of the filtering screen 1, most of impurities are filtered out by these smaller-sized filter particles 2 on the surface of the filtering screen 1 and a very small amount of the impurities go to sides of the filter particles 2 closing to the filtering screen 1. At the same time, since sizes of the filter particles 2 are gradually increased in the direction from the one side to the other side of the filtering screen 1, flow velocity of the water decreases, so that time for the contact between the waste water and the filter particles 2 increases, as a result, an improved impurity filtering effect is achieved.

Optionally, the filtering screen is an elastic filtering screen, so that the filtering screen 1 is capable of bearing an action force produced by a pressure difference between the one side and the other side.

In this embodiment, in order that the filtering screen 1 is capable of bearing the action force (that is produced by the pressure difference between the one side and the other side), preferably, the filtering screen 1 is in a cylinder shape, in this case, the force produced by the pressure difference are divided into a number of components distributing on whole outer surface of the filtering screen 1, and these components of the action force can be counteracted one another, so that the filtering screen suffers relatively-reduced force overall.

In this embodiment, when the filtering element works after a period of time, the filter particles 2 on the filtering screen 1 are required to be replaced, in order to ensure the filtering effect. For preventing the wasted filter particles 2 from polluting the environment, preferably, vegetation fibre particles are used as the filter particles 2 in the present embodiment, because vegetation fibre is natural substance which will not pollute the environment.

Thus it can be seen, the filtering element according to the first embodiment of the present invention has improved filtering effect.

Second Embodiment

Figure 2:
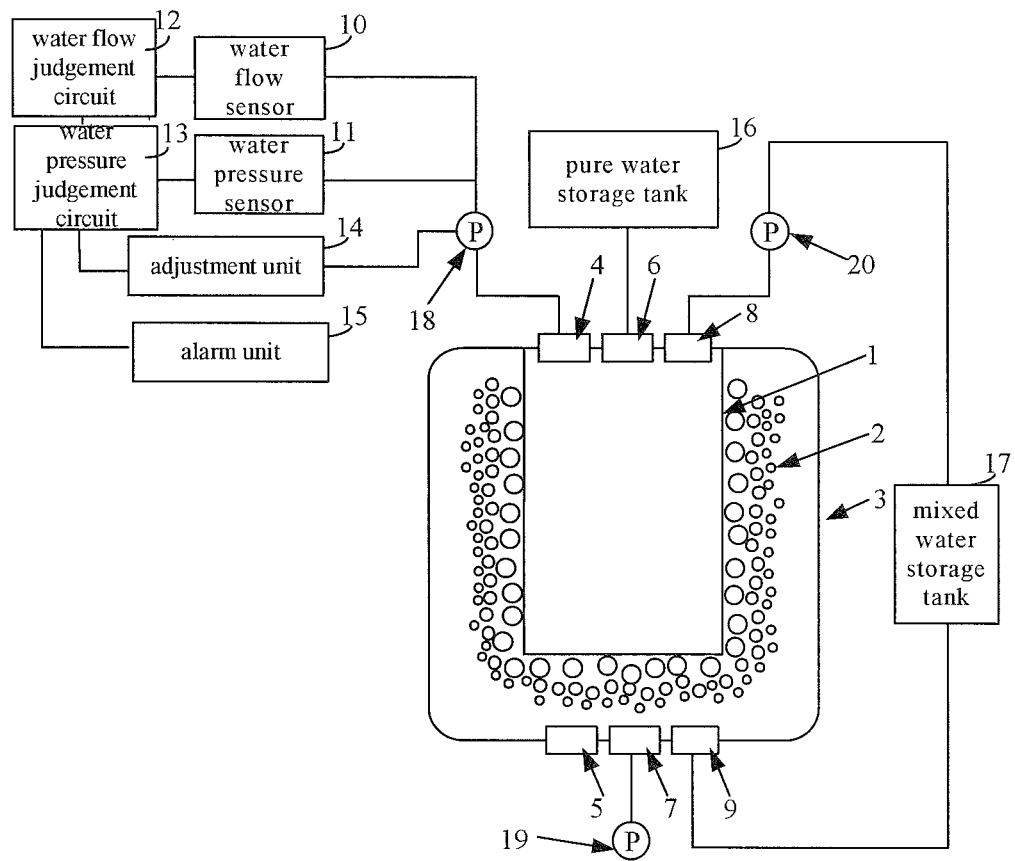
FIG. 2 is a structural schematic view of a filtering equipment according to a second embodiment of the present invention.

FIG. 2 is a structural schematic view of a filtering equipment according to a second embodiment of the present invention. Referring to FIG. 2, the filtering equipment comprises a filtering element according to the abovementioned first embodiment. Its specific structure and principle may refer to the description in the abovementioned first embodiment and will be omitted to avoid duplicating description.

It should be noted that, this embodiment will be described by taking an exemplary example in which the filtering screen 1 is in a cylinder shape, however, it would be appreciated by those skilled in the art that this does not intend to limit the present invention.

In this embodiment, the filtering equipment further comprises a processing chamber 3 having a reclaimed water inlet 5 and a recycling water outlet 4, wherein, the filtering screen 1 is positioned inside the processing chamber 3 and covers the recycling water outlet 4, and, the one side of the filtering screen 1 is in communication with the reclaimed water inlet 5 while the other side of the filtering screen 1 is in communication with the recycling water outlet 4.

Figure 3:
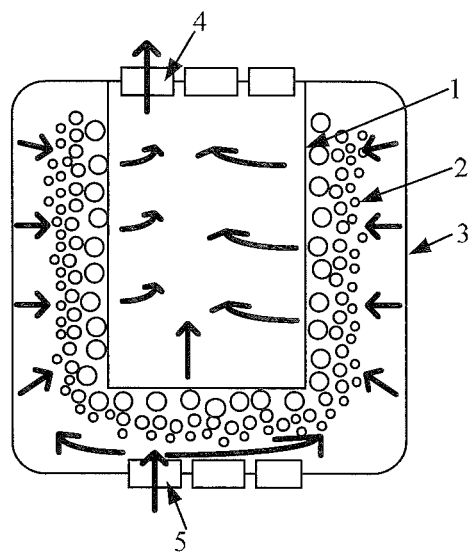
FIG. 3 is a schematic view showing the filtering equipment of FIG. 2 during a filtering process.

FIG. 3 is a schematic view showing the filtering equipment of FIG. 2 during a filtering process. Referring to FIG. 3, during a filtering process, waste water enters the processing chamber 3 through the reclaimed water inlet 5, flows from the one side to the other side of the filtering screen 1, and finally outflows through the recycling water outlet 4. When the waste water passes through the filtering screen 1, impurities in the waste water are filtered out by the filter particles 2 on the filtering screen 1. As a result, water at the other side becomes recycling water which will be reused.

Optionally, a first water pump 18 having a water inlet pipe connected to the recycling water outlet 4 can be provided at the recycling water outlet 4, the first water pump being configured to draw out water within the processing chamber 3 through the recycling water outlet 4. As a result, waste water at the reclaimed water inlet 5 will be suctioned into the processing chamber 3 under external pressure and be filtered.

Optionally, a water flow sensor 10 and a water pressure sensor 11 are provided at a water outlet pipe of the first water pump 18, the water flow sensor 10 is configured to detect an actual water flow at the water outlet pipe of the first water pump 18, and the water pressure sensor 11 is configured to detect an actual water pressure at the water outlet pipe of the first water pump 18. In this embodiment, provision of the water flow sensor 10 and the water pressure sensor 11 helps workers to monitor operational state of the filtering equipment.

In this embodiment, the filtering equipment may further comprise a water flow judgement circuit 12, a water pressure judgement circuit 13 and an adjustment unit 14, wherein the water flow judgement circuit 12 is connected with the water flow sensor 10 and the water pressure judgement circuit 13, the water pressure judgement circuit 13 is connected with the water pressure sensor 11 and the adjustment unit 14, and the adjustment unit 14 is connected with the first water pump 18 and the water pressure judgement circuit 13. The water flow judgement circuit 12 is configured to judge whether or not the actual water flow detected by the water flow sensor 10 is less than a first water flow value. The water pressure judgement circuit 13 is configured to judge whether or not the actual water flow detected by the water flow sensor 11 is greater than a first outlet water pressure value if it is judged by the water flow judgement circuit 12 that the actual water flow is less than the first water flow value. The adjustment unit 14 is configured to turn down the actual water pressure (also named as pump pressure, which can be adjusted by the first water pump 18) at the water outlet pipe of the first water pump 18 if it is judged by the water pressure judgement circuit 13 that the actual water flow detected by the water flow sensor 11 is greater than the first water flow value, so that the actual water flow at the water outlet pipe of the first water pump 18 has a second water flow value which is greater than the first water flow value.

During a filtering process of waste water implemented by the filtering equipment, more and more impurities will be adhered among the filter particles 2 as the filtering process continues, correspondingly, water flow rate at the water outlet pipe of the first water pump 18 will decreases, so that there has a problem that insufficient supply of the recycling water occurs at the downstream. In order to avoid this problem, the pump pressure at the first water pump 18 (i.e., the actual water pressure at the water outlet pipe) is turned down and output power of the first water pump 18 is turned up, so the water flow rate at the water outlet pipe of the first water pump 18 will increases.

During the process of turning down gradually the pump pressure at the first water pump 18, once the actual water pressure at the first water pump 18 is less than or equals to the first outlet water pressure value (that is set depending on performance of the first water pump), a motor for the first water pump 18 will encounter an overload problem, which causes easily the motor to be burned out.

In order to prevent the motor for the first water pump 18 from being burned out, optionally, the filtering equipment may further comprise an alarm unit 15 connected to the water pressure judgement circuit 13 and configured to alarm if it is judged by the water pressure judgement circuit 13 that the actual water pressure detected by the water pressure sensor 11 is less than or equals to the first outlet water pressure value.

In practical applications, the first water flow value can be set at 50 LPM, the second water flow value can be set at a value between 55 LPM~60 LPM, and the first outlet water pressure value can be set at 0.1 MPa.

It is worth to be mentioned that, it should be understood by those skilled in the art that the above settings of the first water flow value, the second water flow value and the first outlet water pressure value are only exemplary, but not to limit the present invention. Suitable adjustment may be applied on the three parameters according to factors including requirements from production line, performance of the first water pump 18 and the like.

When the alarm units 15 alarms, it is indicated that the pump pressure at the first water pump 18 cannot be turned down any more, correspondingly, an amount of the impurities adhered among the filter particles 2 has reached a certain limit, here, the filter particles 2 are required to be replaced. Specifically, replacement of the filter particles 2 includes two processes. A first process is to remove the filter particles 2 on the filtering screen 1, and a second process is to coat new filter particles 2 onto the filtering screen 1.

In order to achieve the process of removing the filter particles 2 on the filtering screen 1 (which is named as "a backwash process" in this embodiment), optionally, the processing chamber 3 may further comprise a backwash inlet 6 and a backwash outlet 7. The backwash inlet 6 is connected to a pure water storage tank 16 within which pure water is pre-stored. The backwash outlet 7 is connected to a water inlet pipe of a second pump 19. The backwash inlet 6 is covered by the filtering screen 1, the one side of the filtering screen 1 is communicated with the backwash outlet 7, and the other side of the filtering screen 1 is communicated with the backwash inlet 6. The second pump 19 is configured to draw out water within the processing chamber 3 through the backwash outlet 7.

Figure 4:
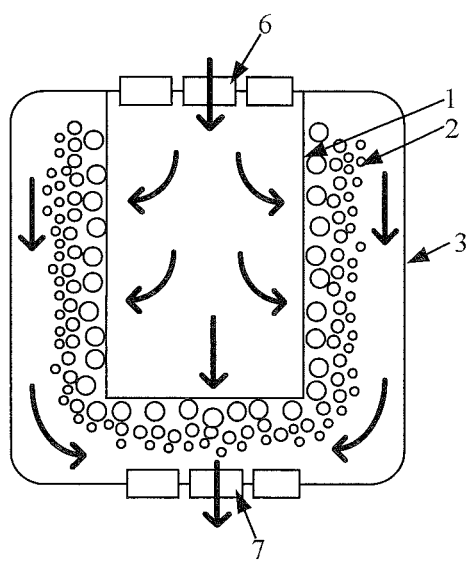
FIG. 4 is a schematic view showing the filtering equipment of FIG. 2 during a backwashing process.

FIG. 4 is a schematic view showing the filtering equipment of FIG. 2 during a backwashing process. Referring to FIG. 4, the filter particles 2 are positioned at the one side of the filtering screen 1 and the one side of the filtering screen 1 is communicated with the backwash outlet 7, accordingly, when the second pump 19 operates to draw out water within the processing chamber 3 through the backwash outlet 7, the filter particles 2 adhered to the filtering screen 1 will broken away from the filtering screen 1 under the action of the water flow and are draw out together with the water flow through the backwash outlet 7. In the process of the backwashing process, the filter particles 2 on the filtering screen 1 will be removed gradually.

In order to coat new filter particles 2 onto the filtering screen 1 (which is named as "a coating process" in this embodiment), optionally, the processing chamber 3 may further comprise a coating inlet 9 and a coating outlet 8. The coating inlet 9 is connected to a mixed water storage tank 17 within which a mixed solution containing pure water and filter particles 2 is pre-stored. The coating outlet 8 is connected to a water inlet pipe of a third pump 20, and a water outlet pipe of the third pump 20 is connected to the mixed water storage tank 17. The coating outlet 8 is covered by the filtering screen 1, the one side of the filtering screen 1 is communicated with the coating inlet 9, and the other side of the filtering screen 1 is communicated with the coating outlet 8. The third pump 20 is configured to draw out water within the processing chamber 3 through the coating outlet 8.

Figure 5:
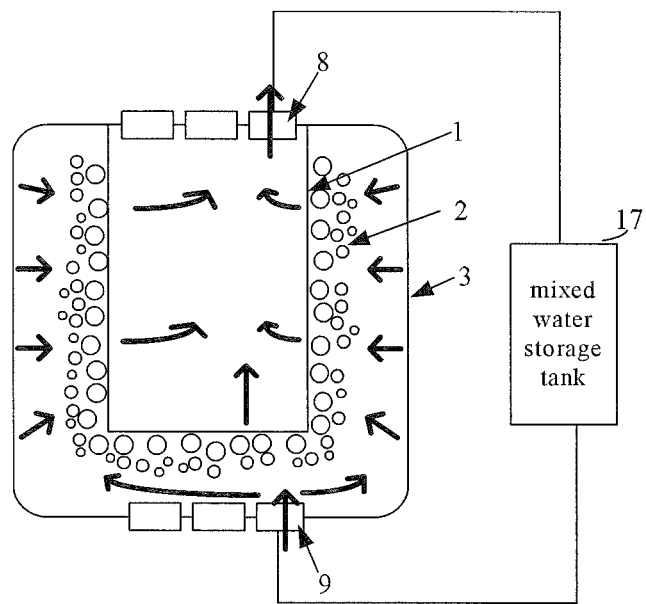
FIG. 5 is a schematic view showing the filtering equipment of FIG. 2 during a coating process.

FIG. 5 is a schematic view showing the filtering equipment of FIG. 2 during a coating process. Referring to FIG. 5, the one side of the filtering screen 1 is communicated with the coating inlet 9 and the other side of the filtering screen 1 is communicated with the coating outlet 8, accordingly, such that when the third pump 20 operates to draw out water within the processing chamber 3 through the coating outlet 8, the mixed solution containing pure water and filter particles 2 within the mixed water storage tank 17 will be suctioned into the processing chamber 3 and also flows from the one side to the other side of the filtering screen 1. Under the action of the filtering screen 1, larger-sized filter particles 2 will be coated firstly onto the one side of the filtering screen 1 while smaller-sized filter particles 2 will pass through the filtering screen 1 and reenter the mixed water storage tank 17. The mixed solution within the mixed water storage tank 17 will pass through the filtering screen 1 continuously under the action of the third pump 20, diameters of the filter particles 2 that are passing through the filtering screen 1 decrease subsequently, and finally a layer of filter particles 2 is formed on the one side of the filtering screen 1. Accordingly, in the layer of filter particles 2, sizes of the filter particles 2 are gradually increased in a direction from the one side to the other side.

It should be noted that, in this embodiment, the water outlet pipe of the third pump 20 is communicated with the mixed water storage tank 17, accordingly, water drawn by the third pump 20 will reenter the mixed water storage tank 17, that is, pure water within the mixed water storage tank 17 can be used repeated, therefore, water source can be effectively saved.

In practical applications, pure water within the mixed water storage tank 17 may be 75 liter (L) in volume, the quality of the filter particles 2 is about 15 gram (g). Pure water within the mixed water storage tank 17 will be stirred (for about 15 s) by using a stirring equipment before implementing the coating process, so that pure water and the filter particles 2 are mixed uniformly. Then, the third pump 20 is started up to implement a coating process circularly, and time of implementing the coating process can be controlled in about 180 s. Through actual tests, the filtering element formed after the abovementioned coating process may have a filtering capability of 1 µm.

It can be learned from the above that, in this embodiment, the filtering element can be cleaned (including the backwash process and the coating process) without removing it from the processing chamber 3, accordingly, time for cleaning the filtering element can be effectively reduced and thus efficiency of the production line is increased. More important is the abovementioned cleaning process needs no manual operation, thereby effectively reducing labor cost.

It is required to add that, the backwash inlet 6, the backwash outlet 7, the coating inlet 9 and the coating outlet 8 will be closed when the filtering equipment of the present embodiment is used to implement a filtering process. The reclaimed water inlet 5, the recycling water outlet 4, the coating inlet 9 and the coating outlet 8 will be closed when the filter particles are removed from the filtering screen 1. The reclaimed water inlet 5, the recycling water outlet 4, the backwash inlet 6 and the backwash outlet 7 will be closed when new filter particles are coating onto the filtering screen 1.

Third Embodiment

Figure 6:
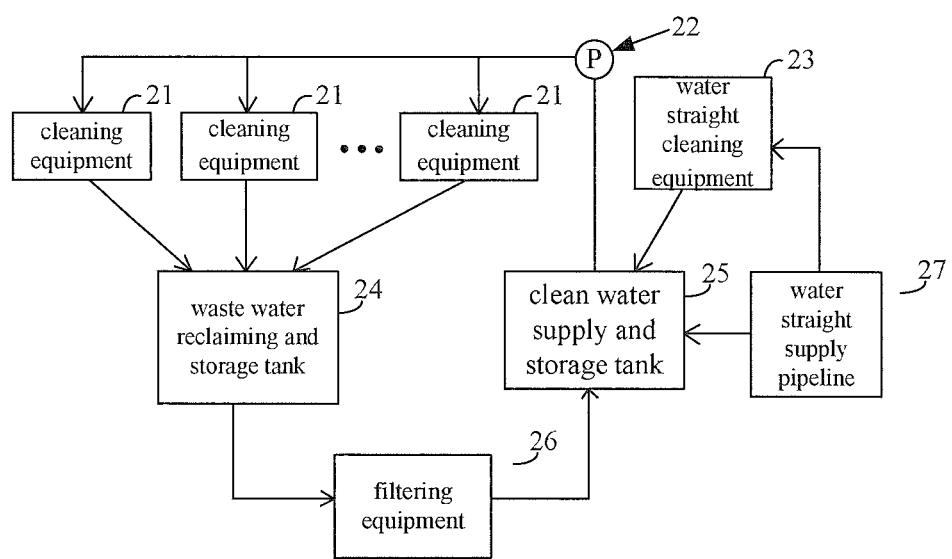
FIG. 6 is a block schematic view of a water circulation cleaning system according to a third embodiment of the present invention.

FIG. 6 is a block schematic view of a water circulation cleaning system according to a third embodiment of the present invention. Referring to FIG. 6, the water circulation cleaning system comprises the filtering equipment according to the abovementioned second embodiment. Its specific structure and principle may refer to the description in the abovementioned second embodiment and will be omitted to avoid duplicating description. In this water circulation cleaning system, recycling water drawn out through the recycling water outlet of the filtering equipment 26 will be utilized by other cleaning equipments.

Optionally, the water circulation cleaning system may further comprise a waste water reclaiming and storage tank 24, a clean water supply and storage tank 25 and a number of cleaning equipments 21, the waste water reclaiming and storage tank 24 is connected to each of the cleaning equipments 21 and the reclaimed water inlet of the filtering equipment 26 by corresponding pipelines, and, the clean water supply and storage tank 25 is connected to each of the cleaning equipments 21 and the recycling water outlet of the filtering equipment 26 by corresponding pipelines. The waste water reclaiming and storage tank 24 is configured to reclaim waste water produced in each of the cleaning equipments 21 and to supply the filtering equipment 26 with the reclaimed waste water. The clean water supply and storage tank 25 is configured to store recycling water that is subject from a filtration process by the filtering equipment 26 and to supply each of the cleaning equipments 21 with water source for cleaning.

In this water circulation cleaning system, waste water produced in each of the cleaning equipments will be reclaimed to the waste water reclaiming and storage tank 24, the waste water within the waste water reclaiming and storage tank 24 is converted to recycling water after being treated by the filtering equipment 26 and the recycling water is stored within the clean water supply and storage tank 25, and, the recycling water within the clean water supply and storage tank 25 can be supplied to these cleaning equipments 21 for cleaning. As a result, a cycle use of the cleaning water is achieved, thereby effectively avoiding waste of water source.

Optionally, a fourth water pump 22 is provided at a pipeline between the clean water supply and storage tank 25 and each of the cleaning equipments 21, a water inlet pipe of the fourth water pump 22 is communicated with the clean water supply and storage tank 25, and, a water outlet pipe of the fourth water pump 22 is communicated with the cleaning equipments 21. The fourth water pump 22 is configured to pump recycling water within the clean water supply and storage tank 25 to corresponding cleaning equipments 21.

As a control mechanism adopted in the present embodiment, the fourth water pump 22 stops operating when (or after 5 seconds) waste water are not detected at these cleaning equipments 21.

It should be mentioned that, in this embodiment, the cleaning equipments 21 may be brush cleaning equipments, grinding cleaning equipments, post-grinding cleaning equipments, double-fluid cleaning equipments, and the like.

It would be appreciated by those skilled in the art that, a water straight supply pipeline 27 configured to supply a water straight cleaning equipment 23 with clean water is generally provided in production lines. Optionally, in this embodiment, the clean water supply and storage tank 25 can be further connected to a water straight supply pipeline 27. As a result, not only clean water can be supplied to the water straight cleaning equipment 23, which has high cleanness demands on the clean water, in the production lines, but also water can be supplied to the clean water supply and storage tank 25 when an actual water storage in the clean water supply and storage tank 25 is less than a water storage, thereby ensuring normal operation of the overall water circulation cleaning system.

It should be understood that, the above description is merely used to illustrate exemplary embodiments within principles and spirit of the present invention, but not to limit the present invention. It would be appreciated by those skilled in the art that all of changes and modifications made within principles and spirit of the present invention should be included within the scope of the present invention.

What is claimed is:

1. A filtering equipment comprising a filtering element and a processing chamber,
    wherein the filtering element comprises a filtering screen and filter particles adhered to one side of the filtering screen, the filter articles comprise only vegetation fibre particles, the vegetation fibre particles get larger gradually in size as the filter particles get closer to the filtering screen, and wherein the filtering screen is in a cylinder shape;
    wherein the filtering screen is positioned inside the processing chamber;
    wherein the processing chamber comprises a coating inlet connected to a mixed water storage tank and a coating outlet connected to a water inlet pipe of a third pump, and a water outlet pipe of the third pump is connected to the mixed water storage tank;
    the coating outlet is covered by the filtering screen, the one side of the filtering screen is communicated with the coating inlet, and the other side of the filtering screen is communicated with the coating outlet;
    the mixed water storage tank is configured to store a mixed solution containing pure water and filter particles; and
    the third pump is configured to draw out water within the processing chamber through the coating outlet.

2. The filtering equipment of claim 1, wherein, the processing chamber has a reclaimed water inlet and a recycling water outlet, wherein, the filtering screen covers the recycling water outlet, and, the one side of the filtering screen is communicated with the reclaimed water inlet while the other side of the filtering screen is communicated with the recycling water outlet.

3. The filtering equipment of claim 2, further comprising a first water pump having a water inlet pipe connected to the recycling water outlet, the first water pump being configured to draw out water within the processing chamber through the recycling water outlet.

4. The filtering equipment of claim 3, further comprising a water flow sensor provided at a water outlet pipe of the first water pump and configured to detect an actual water flow at the water outlet pipe of the first water pump.

5. The filtering equipment of claim 4, further comprising a water pressure sensor provided at the water outlet pipe of the first water pump and configured to detect an actual water pressure at the water outlet pipe of the first water pump.

6. The filtering equipment of claim 5, further comprising a water flow judgement circuit, a water pressure judgement circuit and an adjustment unit, wherein the water flow judgement circuit is connected with the water flow sensor and the water pressure judgement circuit, the water pressure judgement circuit is connected with the water pressure sensor and the adjustment unit, and the adjustment unit is connected with the first water pump and the water pressure judgement circuit;
    the water flow judgement circuit is configured to judge whether or not the actual water flow detected by the water flow sensor is less than a first water flow value;
    the water pressure judgement circuit is configured to judge whether or not the actual water pressure detected by the water pressure sensor is greater than a first outlet water pressure value if it is judged by the water flow judgement circuit that the actual water flow is less than the first water flow value; and
    the adjustment unit is configured to turn down the actual water pressure at the water outlet pipe of the first water pump if it is judged by the water pressure judgement circuit that the actual water pressure detected by the water pressure sensor is greater than the first water pressure value, so that the actual water flow at the water outlet pipe of the first water pump has a second water flow value which is greater than the first water flow value.

7. The filtering equipment of claim 6, further comprising an alarm unit connected to the water pressure judgement circuit and configured to alarm if it is judged by the water pressure judgement circuit that the actual water pressure detected by the water pressure sensor is less than or equals to the first outlet water pressure value.

8. The filtering equipment of claim 2, wherein, the processing chamber further comprises a backwash inlet connected to a pure water storage tank and a backwash outlet connected to a water inlet pipe of a second pump;
    the backwash inlet is covered by the filtering screen, the one side of the filtering screen is communicated with the backwash outlet, and the other side of the filtering screen is communicated with the backwash inlet;
    the pure water storage tank is configured to store pure water; and
    the second pump is configured to draw out water within the processing chamber through the backwash outlet.

9. A water circulation cleaning system comprising a filtering equipment of claim 2.

10. The water circulation cleaning system of claim 9, further comprising a waste water reclaiming and storage tank, a clean water supply and storage tank and a plurality of cleaning equipments, the waste water reclaiming and storage tank is connected to each of the cleaning equipments and the reclaimed water inlet of the filtering equipment by corresponding pipelines, and, the clean water supply and storage tank is connected to each of the cleaning equipments and the recycling water outlet of the filtering equipment by corresponding pipelines;
    the waste water reclaiming and storage tank is configured to reclaim waste water produced in each of the cleaning equipments and to supply the filtering equipment with the reclaimed waste water; and
    the clean water supply and storage tank is configured to reclaim recycling water that is performed a filtration process by the filtering equipment and to supply each of the cleaning equipments with water source for cleaning.

11. The water circulation cleaning system of claim 10, wherein a fourth water pump is provided at a pipeline between the clean water supply and storage tank and each of the cleaning equipments, a water inlet pipe of the fourth water pump is communicated with the clean water supply and storage tank, and, a water outlet pipe of the fourth water pump is communicated with the cleaning equipments; and the fourth water pump is configured to pump recycling water within the clean water supply and storage tank to corresponding cleaning equipments.

12. The water circulation cleaning system of claim 10, further comprising a water straight supply pipeline connected to the clean water supply and storage tank and configured to supply the clean water supply and storage tank with water when an actual water storage in the clean water supply and storage tank is less than a water storage.

13. The filtering equipment of claim 1, wherein, the filtering screen comprises an elastic filtering screen.

\* \* \* \* \*